United States Patent [19]

Di Domizio et al.

[11] 4,132,990
[45] Jan. 2, 1979

[54] AMTI TARGET/CLUTTER DISCRIMINATOR

[75] Inventors: John A. Di Domizio, Norwalk; George T. Briechle, Monroe; Douglas Ell, West Hartford, all of Conn.

[73] Assignee: United Technologies Corporation, Hartford, Conn.

[21] Appl. No.: 841,504

[22] Filed: Oct. 12, 1977

[51] Int. Cl.² .............................................. G01S 9/42
[52] U.S. Cl. ..................................... 343/7 A; 343/7.7
[58] Field of Search ................................. 343/7 A, 7.7

[56] References Cited

U.S. PATENT DOCUMENTS

| 3,500,396 | 3/1970 | Lampert et al. | 343/7 A |
|---|---|---|---|
| 3,962,704 | 6/1976 | Evans | 343/7.7 |
| 3,972,041 | 7/1976 | Howard | 343/7 A X |
| 3,995,270 | 11/1976 | Perry et al. | 343/7 A |

Primary Examiner—T.H. Tubbesing
Attorney, Agent, or Firm—M. P. Williams

[57] ABSTRACT

In an AMTI radar of the type in which the difference between the phase of a current radar return signal and the phase of a radar return signal in a corresponding range bin of a preceding pulse repetition interval (PRI) is averaged over a number of range bins in the range vicinity of the current range bin, phase differences for current range bins are determined as being clutter-like or non-clutter-like by comparison with the previously-determined average phase difference by means of a rectangular distance discriminator which compares the normalized in-phase and quadrature components (cosine and sine, respectively) of the current phase difference with the normalized in-phase and quadrature components of the average phase difference in a rectangular distance discriminator. The rectangular distance discriminator sums the absolute values of the in-phase difference and the quadrature difference and compares them against a rectangular distance discriminant, which in a preferred embodiment is unity. When the summation of the absolute value of the in-phase and quadrature differences exceed the discriminant, the previously-determined phase average components are reintroduced into the phase averaging process; but when it is less than the discriminant, the current phase differences are introduced into the phase averaging process.

2 Claims, 3 Drawing Figures

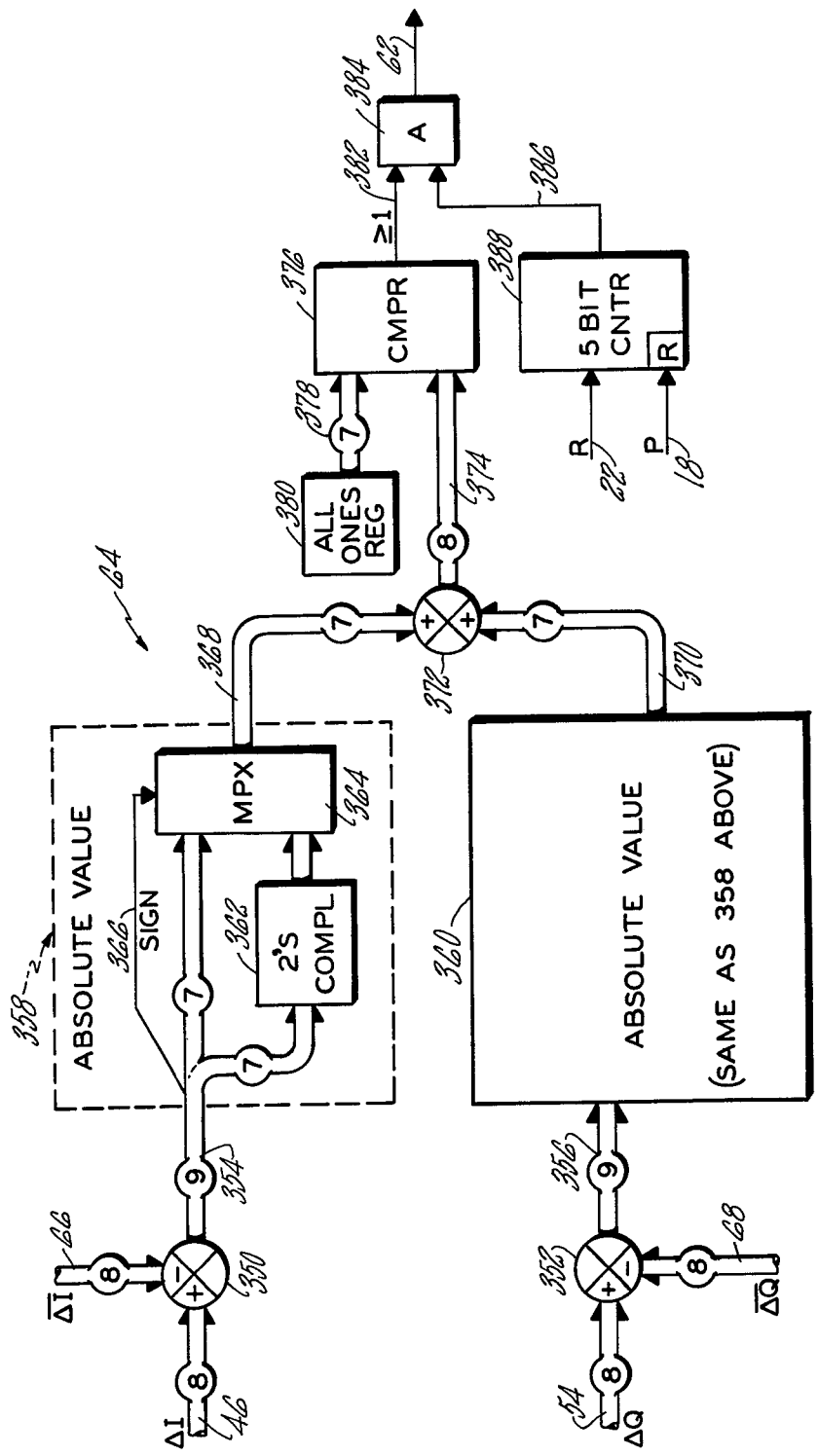

4,132,990

AMTI TARGET/CLUTTER DISCRIMINATOR

The invention disclosed herein was made in the course of or under a contract with the Department of the Navy.

CROSS REFERENCE TO RELATED APPLICATIONS

The present invention is disclosed herein as being incorporated in an adaptive moving target indicator radar system which is more fully disclosed and claimed in a commonly owned copending application entitled ANGLE/VECTOR PROCESSED, PHASE-ACCUMULATED, SINGLE VECTOR ROTATION, VARIABLE ORDER AMTI PROCESSOR, Ser. No. (841,279), filed on Oct. 12, 1977 by Briechle, DiDomizio, and Weindling.

BACKGROUND OF THE INVENTION

1. Field of Art

This invention relates to adaptive moving target indicator radar processing, and more particularly to improvements in discrimination against non-clutter-like signals in clutter phase estimation processes.

2. Description of the Prior Art

As is known, clutter-locking MTI radars enhance the detectability of moving targets in a clutter background by means of a clutter rejection filter, the return signals being processed therethrough after rotation in phase angle so as to shift the clutter phase centroid to the null of the MTI filter. The success of clutter rejection is commonly referred to as MTI improvement, and relates to the extent to which the clutter is suppressed with respect to moving targets. MTI processing known to the prior art generally provides an average of the phase difference, from one pulse repetition interval (PRI) to the next, of return signals in non-target range bins in the range vicinity of the particular signal being processed. This average phase difference is used to rotate the return signals, thereby concentrating the clutter near the null of the clutter rejection filter, so as to achieve maximum improvement.

Major practical problems in achieving maximum MTI improvement in radar systems known to the art have included the gross errors in estimated clutter phase which result by providing phase difference averaging in the angle domain, which does not compensate for discontinuity in angle and therefore provides significantly erroneous results in summations thereof; and in phase averaging which includes target return signal magnitude. These problems are largely overcome by the improved AMTI disclosed in the aforementioned copending application, in which phase averaging is achieved in the vector format, utilizing normalized sines and cosines of the return signal vectors, so as to avoid ambiguity and to avoid contamination from return signal magnitude variations. The utilization of unit vector, or normalized values of in-phase and quadrature components of return signals in the phase estimation technique tends to minimize corruption of estimated phase by inclusion of large targets therein; but, when targets become very large, such as spanning four range bins or the like, even a normalized representation thereof constitutes a significant component of the signal and results in large errors in average clutter phase estimation. For example, theoretical losses in MTI improvement which result from contamination by moving targets entering into the average phase difference calculation are reduced from on the order of 30dB by about 1.5dB for moving targest occupying a single range bin and by about 5dB for moving targets occupying four range bins.

One consequence of contamination of phase estimates is the occurrence of false alarms (that is, acquiring an indication of a moving target when there is none). This results from the fact that if the null of the clutter cancelling filter is adjusted at other than the true average clutter phase, then some of the clutter will survive the filter with a target-like magnitude and be recognized as a target, when in fact it is not. And, commensurately, actual moving targets which should be detected may be lost.

SUMMARY OF THE INVENTION

Objects of the present invention include provision of improved clutter discrimination in clutter-locking MTI phase estimation.

According to the present invention, the normalized inphase and quadrature components of the phase difference between a current radar return signal and a radar return signal in a corresponding range bin of a preceding pulse repetition interval (PRI) are respectively compared with the normalized in-phase and quadrature components of average such phase differences calculated during the same PRI for a plurality of range bins in the range vicinity of the current radar return signal; if the total disparity between the respective rectangular components is less than a given amount, then the incoming current return signal phase difference is recognized as being clutter-like and is included in the further processing of the estimate; but if the total disparity between the respective rectangular components is in excess of that given amount, then the current phase difference is recognized as not being clutter-like, e.g., either large noise in a low clutter environment, or a target, so the purity of the phase estimate is maintained by reintroducing it into the phase estimation process. In further accord with the present invention, a rectangular distance discriminant of unity is compared with the sum of the differences in the respective normalized in-phase and quadrature compnents of current and average phase differences having values which vary between zero and one. In still further accord with the present invention, both the in-phase and quadrature, normalized components of the estimated phase difference are subtracted respectively from the in-phase and quadrature components of the current phase difference, and the absolute value of the two subtractions are added together to determine the rectangular distance; if the rectangular distance is less than one, the current phase difference is accepted as being clutter-like; if the rectangular distance is greater than one, the current phase difference is rejected as not being clutter-like, and the previous phase estimate is reintroduced into the averaging process so as to preserve its viability.

The present invention provides a very simple process for a fairly effective clutter discriminator. The rectangular distance clutter discriminator in accordance with the present invention provides, effectively, a variable-angle discriminator which, however, nonetheless provides MTI improvements which are substantially the same as a theoretical fixed-angle discriminator of a much more complex variety. The present invention is simple to implement, and is readily adaptible for incorporation in adaptive MTI radar systems, particularly of the digital variety.

The foregoing and other objects, features and advantages of the present invention will become more apparent in the light of the following detailed description of preferred embodiments thereof, as illustrated in the accompanying drawing.

BRIEF DESCRIPTION OF THE DRAWING

FIG. 3 is a schematic block diagram of an embodiment of the present invention.

DETAILED DESCRIPTION

Figure 1:
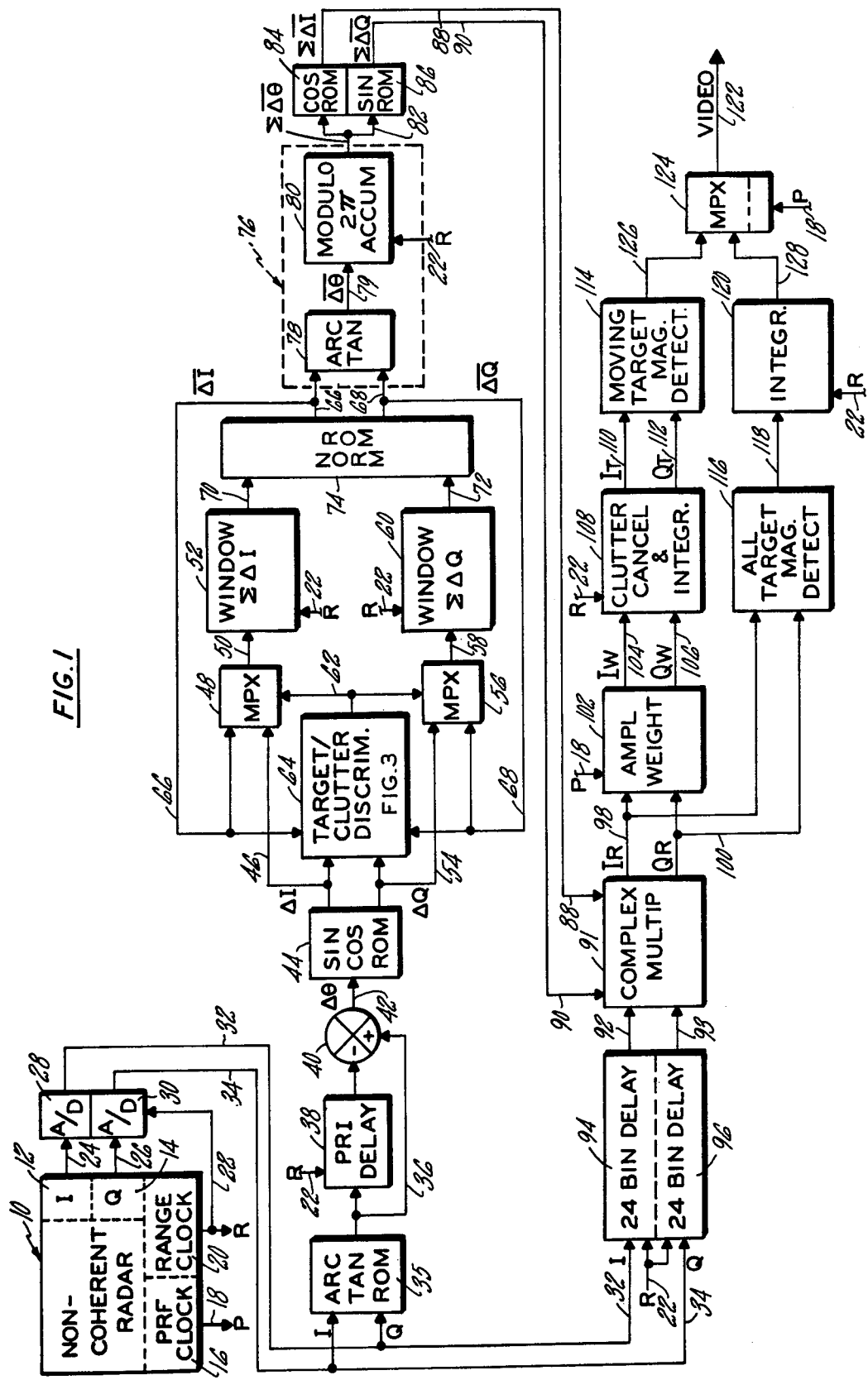
FIG. 1 is a simplified schematic block diagram of an AMTI radar processing apparatus of the type disclosed in detail in the aforementioned copending application, which may form the environment for utilization of a clutter discriminator according to the present invention.
Figure 2:
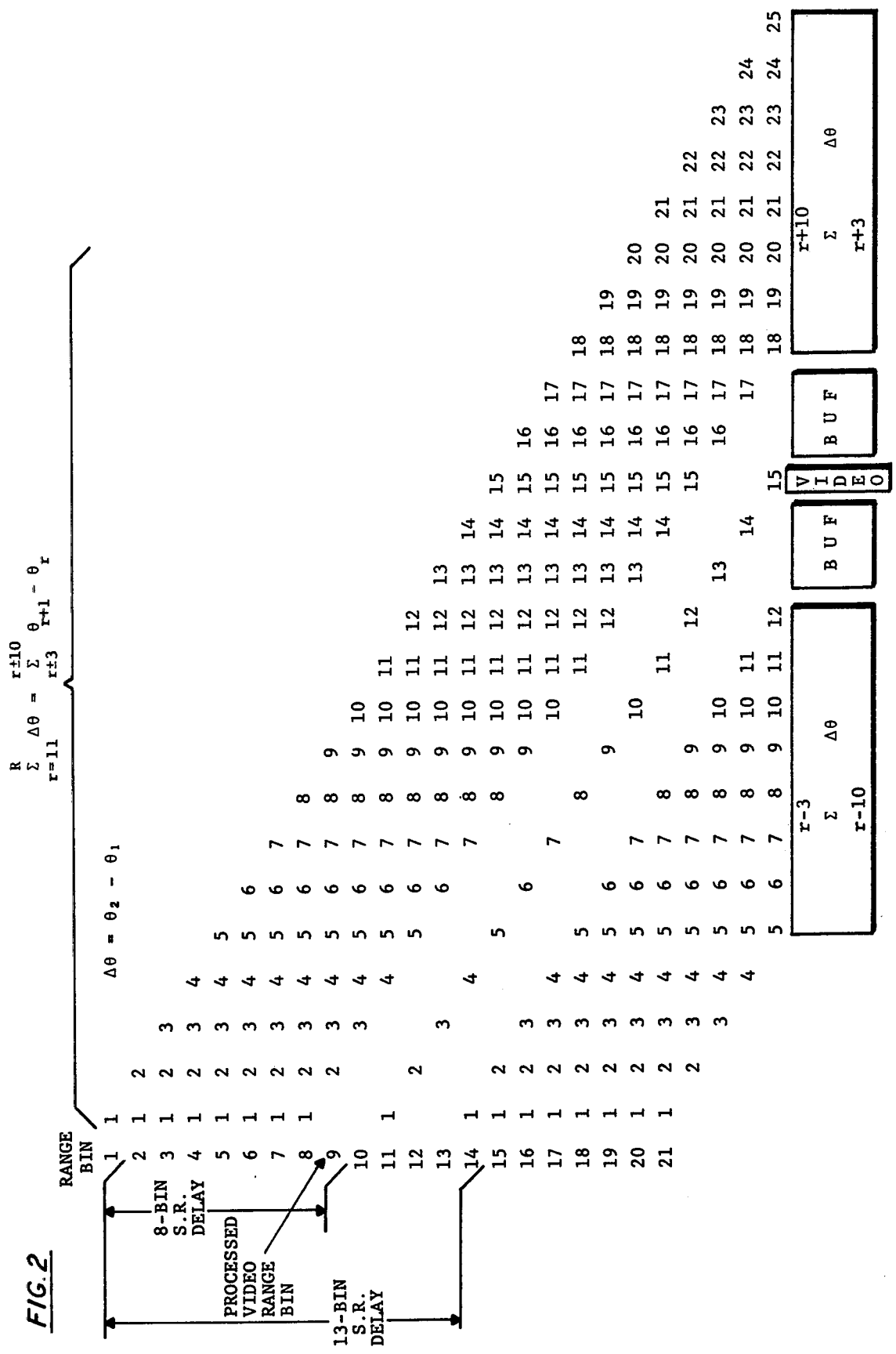
FIG. 2 is a chart illustrating the phase estimation process in the system of FIG. 1.

To facilitate an understanding of the environment of the present invention, a brief description of an AMTI processing apparatus, as disclosed in the aforementioned copending application, is first presented with respect to FIGS. 1 and 2 herein, in which the reference numerals are the same as those utilized in the aforementioned copending application.

Referring now to FIG. 1, the present invention is utilized in processing signals acquired by a radar 10 of the type known in the art, which processes its IF frequency information in two difference channels shifted in phase by 90° so as to provide signals indicative of radar returns as the intermediate frequency in an in-phase channel (I) 12 and in a quadrature channel (Q) 14, as well as to provide signals (P) for each transmission or "main bang" from a pulse repetition frequency (PRF) clock 16 on a line 18, and signals (R) delineating each of the range bins from a range clock 20 on a line 22. One of the advantages of the invention is that it provides moving target detection amidst clutter in radars which are non-coherent (that is, the IF is not generated with a signal coherent with the transmitted pulse); however, the invention may be used with coherent radar, if desired.

The I and Q IF signals are provided in analog fashion on lines 24 and 26 to respective analog to digital (A/D) converters 28, 30, the output of which on lines 32 and 34 are digital representations of the magnitudes of the in-phase and quadrature components (respectively) of the return wave as received by the radar, for each of a sequence of range bins (which may, in the example herein, include 2048 range bins) for each transmitted pulse (occurring once each pulse repetition interval, or PRI). The remainder of the disclosure herein is digital in nature and, for simplicity, FIG. 1 has been shown with individual signals lines, rather than trunks of lines to accommodate words of binary bits. In the embodiment described herein, it is presumed that the digital data is in two's complement form. As is known, positive numbers contain zero in the high order bit and negative numbers contain one in the high order bit and combination of ones and zeros in lower ordered bits to represent the binary value; in an eight-bit word; e.g., a maximum positive number is 01111111 and a maximum negative number is 10000000. And as is known, conversion from a positive number to a negative and vice versa is accomplished by simple complementing of each bit, followed by adding a one into the low order bit.

The I and Q signals are applied by lines 32 and 34 to a read-only memory (ROM) 35 which supplies on line 36 the arc tangent corresponding to the cosine (I) and sine (Q) inputs thereto. These are stored for one PRI in a 2048 bit shift register 38, the output of which is subtracted from the output of the ROM 34 in a subtractor 40. For any given range bin, the output of the subtractor 40 on lines 42 is the phase difference between the returns of the last two PRIs. This is referred to herein as $\Delta\theta$. The purpose of utilizing the ROM 34 to convert to phase angle prior to the one PRI delay and subtraction is simply to reduce the amount of hardware required and to reduce the accumulation of error, since providing the phase difference in the form of I and Q signals would require twice as much storage across 2048 range bins and a complex multiplication at this point, rather than a simple digital subtraction.

The signals representing $\Delta\theta$ for each range bin in each PRI are applied to a sine and cosine ROM 44 to reconvert the signals into the I/Q domain for further processing in accordance with the present invention. This eliminates error from angle ambiguity, since the sines and cosines of resultant $\Delta\theta$'s are unambiguous (e.g., $+35° - (+350°) = -225°$, having same sine/cosine as $+45°$, the desired result). The $\Delta I$ signals on the lines 46 are connected to a multiplexer 48, the output of which on lines 50 is applied to window circuitry 52 for summing the $\Delta I$ signals over the range bins in a sliding window as is described in detail in the aforementioned copending application, and as illustrated in FIG. 2 herein. Similarly, the $\Delta Q$ signals on lines 54 are connected to a multiplexer 56, the output of which on lines 58 are applied to window circuitry 60 for generating the summation of $\Delta Q$ over the range bins in the aforementioned window. The multiplexer circuits 48, 56 may be operated by a signal on a line 62 generated by a target/clutter discriminator 64, as is described in detail with respect to FIG. 3 hereinafter, in the event that comparison of the $\Delta I$ and $\Delta Q$ signals currently being processed with previously calculated average ($\overline{\Delta I}$) signals on lines 66 and/or average ($\overline{\Delta Q}$) signals on lines 68 indicate that the current varies widely from the average, and thus the probability of polluting the clutter phase estimate. This may be as a consequence of the current range bin including a target, or significant noise (compared to the clutter), or any other non-clutter-like signal. In such case, the previously calculated averages $\overline{\Delta I}$, $\overline{\Delta Q}$ on lines 66 and 68 are utilized instead of the current $\Delta I$ and $\Delta Q$ signals on the lines 46 and 54, to preserve the phase estimate, in accordance with the invention. It is one of the features of the magnitude-free I and Q processing of the AMTI disclosed in FIG. 1 that contamination by targets is reduced, even without clutter discrimination, because the signals on the lines 46 and 54 are normalized into fractions between zero and one as determined by the sine/cosine ROM 44. This is in contrast with the prior art wherein processing includes rotation of unnormalized I and Q inputs by complex multiplication, thereby including large target vector magnitude contamination, or is accomplished purely in the angle domain, which is ambiguous at plus and minus pi, as described hereinbefore.

The $\Sigma\Delta I$ and $\Sigma\Delta Q$ outputs of the window circuitry 52, 60 on lines 70, 72 are normalized in a ROM 74 to provide normalized average $\Delta I$ signals ($\overline{\Delta I}$) on the lines 66 and normalized average $\Delta Q$ signals ($\overline{\Delta Q}$) on lines 68. These are applied to a phase accumulator circuit 76 which (as is described more fully in the aforementioned copending application) includes an arc tangent generator 78 to provide an average phase difference signal ($\overline{\Delta\theta}$) on lines 80 to a modulo two pi accumulator 80, the output of which on lines 82 constitutes a running summation, modulo two pi, of the average phase of signals received by the radar, $\Sigma\overline{\Delta\theta}$. This signal is reconverted into I/Q format by sine and cosine ROMs, the outputs of which ($\Sigma\overline{\Delta I}$ and $\Sigma\overline{\Delta Q}$) on lines 88 and 90 are provided to vector rotation means such as complex multiplier circuitry 92, the details of which are described in said copending application. The purpose of the complex multiplier circuitry 92 is, as known in the art, to rotate the incoming data in any given range bin during a given PRI by a given angle. In this system, the angle is the running summation of average phase difference in succeeding PRIs for range bins surrounding the given range bin (due to the manner of operation of the window circuitry 52 as illustrated in FIG. 2). This causes a four-PRI or five-PRI batch of return signals to be rotated back to the estimated clutter phase of the first PRI in the batch, whereby the batch can be passed through a third- or fourth-order clutter elimination filter in a manner which is described with respect to FIGS. 6–8 hereinafter. Thus, the $\Sigma\overline{\Delta I}$ and $\Sigma\overline{\Delta Q}$ signals on the lines 88, 90 represent the estimated phase through which each incoming signal must be rotated in order to achieve the desired clutter filtering, and the complex multiplier 91 provides the desired rotation.

In order to cause the data on lines 32 and 34 to align itself on a correct range bin basis with the corresponding $\Sigma\overline{\Delta I}$ and $\Sigma\overline{\Delta Q}$, the incoming data on lines 32 and 34 is delayed a requisite amount in related shift registers 94, 96. As is described more fully with respect to FIG. 2 hereinafter, there is an inherent ten range-bin delay required by the processing used herein, and, in the present embodiment, there is an additional fourteen range bins of equivalent circuit propagation time delay involved in the processing. Thus, in the embodiment disclosed herein, a twenty four range bin delay is required in the circuits 94, 96; this may vary in other embodiments, wherein the processing time, and/or the numbers of range bins across which averages are taken, may vary.

After the incoming data is rotated by a phase angle representing the summation of average phase differences (from successive PRIs) of clutter surrounding the target, to provide rotated information signals $I_R$ and $Q_R$ on lines 98, 100, the data is weighted in amplitude by circuitry 102 to provide weighted signals $I_W$ and $Q_W$ on lines 104, 106 for application to a clutter cancelling and integration circuit 108, the output of which comprises in-phase and quadrature components $I_T$, $Q_T$ on lines 110, 112, of substantially moving target information for detection in a magnitude detecting circuit 114. In order to detect all targets, whether moving or not, the rotated I and Q components of the data on lines 98 and 100 are provided to a magnitude detector 116, the output of which on lines 118 is integrated in an integrator 120. The video output of the apparatus is provided on lines 122 by a multiplexer 124 in response either to moving targets provided on lines 126 by the moving target magnitude detector 114 or to all targets on lines 128 provided by the all-target integrator 120.

The chart of FIG. 2 illustrates how the $\Delta I$ and $\Delta Q$ signals are summed to provide summations for eight range bins ahead of and behind the range bin of interest and separated therefrom on either side by a buffer of two range bins, which avoid large-target contamination of the summation. Thus, in FIG. 2, for each PRF, the summations begin with the first range bin and continue for each successive range bin, by adding the $\Delta I$ (in the window summation unit 52) and the $\Delta Q$ (in the window summation unit 60) signals of each successive range bin into the previous accumulation, while subtracting the $\Delta I$ or $\Delta Q$ signal from the ninth previous range bin from the summation. Thus by the eighth range bin, there is an 8-bin summation. During the ninth through thirteenth range bins, no further summations are made. Then, beginning with the fourteenth range bin, an additional eight range bin summation is commenced, starting with the $\Delta I$ and $\Delta Q$ signals of the first range bin. This provides, in the twenty-first range bin, an 8-bin summation for range bins one through eight, separated by a 2-bin buffer zone ahead of the range bin of interest (which is range bin eleven). And this is followed by a 2-bin buffer and an 8-bin summation consisting of the $\Delta I$ and $\Delta Q$ signals summed across range bins fourteen through twenty-one. Thus it is, in the twenty-first range bin, that the first valid comparison of the normalized output on lines 66 and 68 can be made with the incoming $\Delta I$ and $\Delta Q$ signals on the lines 46 and 54. After the twenty-first range bin, the two sets of summations and buffer zones continue to advance, range bin by range bin, throughout the remainder of that PRF. The detailed apparatus of the window summation units 52, 60, which perform this summation process with the buffer zones, is described in the aforementioned copending application.

Referring now to FIG. 3, an exemplary embodiment of a target/clutter discriminator 64 in accordance with the present invention includes a pair of subtractors 350, 352 that provide on corresponding lines 354, 356 the difference between the current in-phase and quadrature components of the phase difference between successive PRIs in the same range bins ($\Delta I$, $\Delta Q$), and the corresponding average in-phase and quadrature components of the phase difference determined across sixteen previous pulse repetition intervals ($\Sigma\overline{\Delta I}$, $\Sigma\overline{\Delta Q}$), as is described briefly with respect to FIG. 2 hereinbefore and more fully in the aforementioned copending application. The signals on the lines 354, 356 are respectively applied to absolute value circuits 358, 360, each of which includes a two's complementor circuit 362 and a multiplexer 364 which is switched to select the output of the two's complementor if the high order bit of the word, on a line 366, indicates that the word is negative, the multiplexer passing the seven low order bits on the lines 354 if the high order bit on the line 366 indicates that the word is positive. Thus the outputs of the absolute value circuits 358, 360 on lines 368, 370 are representations of positive magnitude of the difference in the cosine and the sine, respectively, between the average phase difference and the current phase difference. These are added together in an adder 372, and the sum thereof on lines 374 is compared in a comparator 376 with a digital word on lines 378 from a register 380 which represents a value indicative of an excessive phase difference, which constitutes a rectangular distance discriminant, D. In the present case, the register 380 contains all ones so that it represents the maximum sine or cosine value; if the sum of the absolute values of the sine and cosine differences, on the lines 374, is greater than unity, which is represented by all ones in the register 380, then the comparator 376 will provide an equal-to-or-greater-than-one signal on a line 382 which, if passed through an AND circuit 384, will provide the signal on the line 62 which operates the multiplexers 48, 56 in FIG. 1 to select the previously generated average phase difference ($\overline{\Delta I}$, $\overline{\Delta Q}$) instead of the target (or noise) contaminated current phase difference ($\Delta I$, $\Delta Q$). In FIG. 3, the AND circuit 384 is operated in response to a signal on a line 386 provided by a five-bit counter 388 that is responsive to the PRF clock signal on the line 18 so as to ensure that selection of the previously generated average in-phase and quadrature components of the phase difference is not possible until the thirty-second range bin, meaning that thirty two samples have been made. This number can be varied as desired to suit any particular implementation of the present invention.

Analysis of the operation of AMTI processing apparatus, of the type disclosed briefly hereinbefore and described more fully in the aforementioned copending application, presents several factors relating to clutter discrimination. Inherently, if the discriminant (d) that is, the angle of difference between phase angles used as a test for rejecting or accepting new samples of phase differences, is taken as ±180°, no discrimination will take place since every new phase difference will be within ±180° of the estimate. On the other hand, if d is taken as 0°, then every new phase difference will be rejected except those that are exactly the same as the estimates, which would, of course, confine the estimate to that of the very first value utilized therefor. In general, too wide a discriminant will allow too much non-clutter-like data into the phase averaging process, while too narrow a discriminant will tend to reject some good clutter phases and thus artifically confine the phase estimate. Through detailed analysis of an AMTI of the type disclosed herein (using normalized I and Q averaging), it has been theoretically determined that a fixed angle discriminant, d, which yields a minimum loss in MTI improvement as a consequence of targets is about ±50°; and the value of the preferred discriminant (about 50°) is nearly invarient for targets which extend across from one through four range bins.

On the other hand, the discriminator according to the present invention, which operates on a rectangular distance principal, does not have a constant discrimination angle, but has one which repeats every quadrant and varies within these 90° sectors. Examples of the variation in the discrimination angle for a unity rectangular distance discriminant D are given in the Appendix hereinafter. For a rectangular distance discriminant D of unity, it is seen (Example 3 in the Appendix) that the angular discriminant can vary between 41.5° and 60° for an average phase angle (to be discriminated against) of 30°. As referred to hereinbefore, an ideal angular discriminant is on the order of 50°, but is relatively optimum between 40° and 60°. Additionally, it can be shown mathematically that for an angular discriminant of 50°, the rectangular discriminant D will vary between 0.82 and 1.2. Thus, a rectangular distance discriminant of 1.0 provides a reduction in the loss of MTI improvement, as a consequence of target or noise contamination of phase estimation, which is substantially the same as that which would be provided with very complex circuitry working in the angle domain with an angular discriminator of 50°. However, depending upon the particular manner in which the present invention is utilized, and the characteristics of the AMTI system with which it is associated, the value of the rectangular distance discriminant D may be varied from unity, while still achieving the appreciable advantages of the invention, including simplicity of the implementation and its adaptibility for easy use with vector (I, Q) phase estimation processing.

Although the invention has been shown and described with respect to a preferred embodiment thereof, it should be understood by those skilled in the art that the foregoing and various other changes, omissions and additions in the form and detail thereof may be made therein and thereto, without departing from the spirit and the scope of the invention.

APPENDIX

Examples of the unit distance discriminator using { } to denote absolute value are as follows:

1. $\overline{\Delta\theta} = 45°$: $\cos \overline{\Delta\theta} = +0.71$, $\sin \overline{\Delta\theta} = +0.71$
for $\Delta\theta = 90°$, $\cos \Delta\theta = +0.0$, $\sin \Delta\theta = +1.0$ $D = \{\cos \Delta\theta - \cos \overline{\Delta\theta}\} + \{\sin \Delta\theta - \sin \overline{\Delta\theta}\}$ $D = \{(+0.0) - (+0.71)\} + \{(+1.0) - (+0.71)\}$ $D = \{-0.71\} + \{-0.29\} = 0.71 + 0.29 = 1$ for $\Delta\theta = 0°$, $\cos \Delta\theta = +1.0$, $\sin \Delta\theta = +0.0$ $D = \{(+1.0) - (+0.71)\} + \{(+0.0) - (+0.71)\}$ $D = \{+0.29\} + \{-0.71\} = 0.29 + 0.71 = 1$ so, $-45° \leq \delta \leq 45°$ 2. $\overline{\Delta\theta} = 15°$; $\cos \overline{\Delta\theta} = +0.97$, $\sin \overline{\Delta\theta} = +0.26$
for $\Delta\theta = 57°$, $\cos \Delta\theta = +0.54$, $\sin \Delta\theta = +0.84$ $D = \{(+0.54) - (+0.97)\} + \{(+0.84) - (+0.26)\}$ $D = \{-0.42\} + \{+0.58\} = 0.42 + 0.58 = 1$
for $\Delta\theta = -35.5°$, $\cos \Delta\theta = +0.81$, $\sin \Delta\theta = -0.58$ $D = \{(+0.81) - (+0.97)\} + \{(-0.58) - (+0.26)\}$ $D = \{-0.16\} + \{-0.84\} = 0.16 + 0.84 = 1$ $\delta = 57° - 15° = 42°$ $\delta = -35.5° - 15° = -50.5°$ so, $-50.5° \leq \delta \leq 42°$ 3. $\overline{\Delta\theta} = 30°$: $\cos \overline{\Delta\theta} = +0.86$, $\sin \overline{\Delta\theta} = +0.50$
for $\Delta\theta = -30°$, $\cos \Delta\theta = +0.86$, $\sin \Delta\theta = -0.50$ $D = \{(+0.86) - (+0.86)\} + \{(-0.50) - (+0.50)\}$ $D = \{+0.0\} + \{-1\} = 1$ for $\Delta\theta = +71.5°$, $\cos \Delta\theta = +0.31$, $\sin \Delta\theta = +0.95$ $D = \{(+0.31) - (+0.86)\} + \{(+0.95) - (+0.50)\}$ $D = \{-0.55\} + \{(+0.45)\} = 0.55 + 0.45 = 1$ $\delta = -30° - 30° = -60°$; $\delta = 71.5° - 30° = 41.5°$ so, $-60° \leq \delta \leq +41.5°$

Having thus described a typical embodiment of our invention, that which we claim as new and desire to secure by Letters Patent is:

1. In an AMTI processing apparatus of the type which processes return signals so as to provide $\Delta I$ and $\Delta Q$ signals which indicate the cosine and sine of the difference between the phase of the return signal in a given range bin during one PRI from the phase of the return signal of a corresponding range bin in a preceding PRI, and which includes averaging means which provides $\overline{\Delta I}$ and $\overline{\Delta Q}$ signals indicative of the average of the $\Delta I$ and $\Delta Q$ signals over some number of range bins in the range vicinity of the given range bin, clutter discrimination apparatus comprising:

first means responsive to said $\Delta I$ and said $\overline{\Delta I}$ signals for providing a first absolute value signal indicative of the absolute value of the difference between the magnitudes of said $\Delta I$ and $\overline{\Delta I}$ signals;

second means responsive to said $\Delta Q$ and $\overline{\Delta Q}$ signals for providing a second absolute value signal indicative of the absolute value of the difference between the magnitudes of said $\Delta Q$ and $\overline{\Delta Q}$ signals;

summation means responsive to the outputs of said first and second means for providing sum signals indicative of the summation of the absolute values of the differences between said $\Delta I$ and $\overline{\Delta I}$ signal magnitudes and said $\Delta Q$ and $\overline{\Delta Q}$ signal magnitudes;

discriminant means for presenting D signals indicative of the magnitude of a rectangular distance discriminant;

comparison means responsive to said D signals and to said sum signals for providing a compare signal indicative of the relative magnitudes thereof; and switch means responsive to said $\Delta I$ and $\overline{\Delta I}$ signals and to said $\Delta Q$ and $\overline{\Delta Q}$ signals, respectively, and operative in response to said compare signal for alternatively selecting either said $\Delta I$ signals and said $\Delta Q$ signals or said $\overline{\Delta I}$ signals and said $\overline{\Delta Q}$ signals for presentation to said averaging means in dependence on said sum signals representing a value less than or more than that of said D signals, respectively.

2. Discriminator apparatus according to claim 1 additionally comprising gate means interposed between said comparison means and said switch means and operative to prevent said compare signal from operating said switch means prior to the processing of a given number of range bins in each PRI, whereby to ensure that the average phase difference represented by said $\overline{\Delta I}$ and $\overline{\Delta Q}$ signals are not presented to said averaging means until a sufficient sample thereof has been made.

* * * * *